United States Patent [19]

Gusman et al.

[11] 3,937,860

[45] Feb. 10, 1976

[54] FILTRATION MATERIAL

[75] Inventors: Irwin J. Gusman, Great Neck, N.Y.; Carlo Strack, Wyckoff, N.J.

[73] Assignee: J. P. Stevens & Co., Inc., New York, N.Y.

[22] Filed: Apr. 23, 1975

[21] Appl. No.: 570,698

[52] U.S. Cl............ 428/228; 156/148; 210/500 R; 210/506; 428/234; 428/235; 428/239; 428/251; 428/285; 428/287
[51] Int. Cl.² ................................ B32B 17/06
[58] Field of Search .......... 428/234, 235, 300, 228, 428/239, 247, 251, 252, 255, 282, 285, 287; 156/148; 28/72.2; 210/500 R, 506

[56] References Cited
UNITED STATES PATENTS

| | | | |
|---|---|---|---|
| 3,059,312 | 10/1962 | Jamieson | 210/500 R |
| 3,090,099 | 5/1963 | Smith | 428/234 |
| 3,298,080 | 1/1967 | Smith | 428/234 |
| 3,570,085 | 3/1971 | Heinemann | 428/235 |

*Primary Examiner*—George F. Lesmes
*Assistant Examiner*—James J. Bell
*Attorney, Agent, or Firm*—Michael T. Frimer; Charles Stein

[57] ABSTRACT

A high temperature resistant filtration material is produced having outer layers of a nonwoven fabric made of fibers of an aromatic polyamide having repeating units of the formula

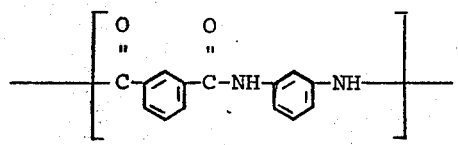

a first inner layer of nonwoven fabric made of glass fibers and a second inner layer woven from yarns of glass or said aromatic polyamide. The fibers of the layers are interentangled by needling to form an integral structure.

6 Claims, No Drawings

FILTRATION MATERIAL

FIELD OF THE INVENTION

This invention relates to a multilayer high temperature resistant filtration material made from glass and an aromatic polyamide.

BACKGROUND OF THE INVENTION

High temperature resistant filtration materials have been prepared by needling fine denier Nomex or fiberglass into supportive scrim made from the same material. When Nomex was utilized it was necessary to calender or otherwise compact the material after needling in order to obtain the desired air permeability. During usage said material tended to swell back to its precalendered density, resulting in leakage of fine dust particles and lowered efficiency.

In the case of filtration material made entirely of fibrous glass, it is not necessary to calender such material and high efficiencies were obtained. However, as a result of the poor flex strength of glass fiber, the longevity of this material is limited.

SUMMARY OF THE INVENTION

In accordance with the present invention a high temperature resistant filtration material or felt is produced which does not have to be calendered to achieve the desired air permeability, thereby assuring permanence of product density during use and continued high filtration efficiencies. Additionally, the product has good flex strength and, thus, can be utilized for a relatively long time.

The product of this invention is obtained by needling together a multilayer composite having outer layers of nonwoven fabric or batting of Nomex fibers, a first inner layer of nonwoven fiberglass material and a second inner layer which is a woven fabric or scrim of glass or Nomex yarn. The fiber entanglement resulting from the needling locks the layers together to form an integral product.

DETAILED DESCRIPTION OF THE INVENTION

The layers of the high temperature resistant filtration material or felt of this invention are needled together by one or more passes through a needle loom. All the layers can be assembled prior to the first needling operation or the layers can be added in stages in a multistep needling operation.

The two outer layers of the composite are formed of nonwoven fabric or batting of an aromatic polyamide known as Nomex, which is composed of recurring units of the formula

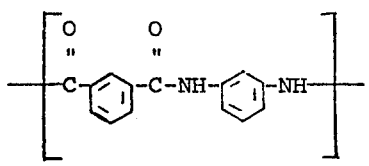

The fibers should be of fine denier, not exceeding five, with the denier of the fiber preferably being in the range of 1.5 to 3. The weight of each Nomex layer should preferably be in the range of 1.5 to 10 ozs./yd.$^2$ The nonwoven glass layer should be composed of fine denier fiberglass having a maximum denier of about 5. The weight preferably should be in the range of about 1 to 10 ozs./yd.$^2$ The woven fabric or scrim layer is made of yarn of either Nomex polyamide or glass. Preferably, the weight of the fabric is within the range of 0.75 to 10 ozs./yd.$^2$

EXAMPLE

The nonwoven Nomex materials used for the outside layers were carded cross-laid webs of 2 denier Nomex fibers having an average length of about two inches. Each of the webs weighed about 3.5 ozs./yd.$^2$ The Nomex woven fabric or scrim was made of single ply yarn which was spun from 2 denier, 2 inch fibers and which had a yarn number of 8.5 based on the cotton system (American hank). There were 18 yarns per inch in both the warp and fill directions.

The glass woven fabric or scrim was made of continuous glass filaments of diameter size G of electrical grade E glass and had a yarn number of 37 (glass system). There were 14 yarns per inch in the warp direction and 13 yarns per inch in the fill direction.

The nonwoven glass fabric or batt was composed of fine denier glass fibers lightly bonded with a thermosetting resin.

A filtration material was made using 5 passes through a needleloom. In the first pass, a layer of the nonwoven Nomex was needled into a layer of the Nomex scrim using the following needleloom settings:

Strokes/Minute = 582
Penetrations/Inch$^2$ = 380
Needle Penetration Depth – ¾ inch
Manufacturing Speed – 12 ft./min. (take-up roll advance)

The scrim side of the composite obtained from the first pass was covered with a layer of the glass batting which in turn was covered with a layer of the nonwoven Nomex material and this assembly was needled together by a pass through a needleloom using the same settings as in the first pass.

The product was then further consolidated by three more passes through a needleloom at the following settings:

| Needleloom Settings | 3rd Pass | 4th Pass | 5th Pass |
|---|---|---|---|
| Strokes/minute | 650 | 650 | 650 |
| Penetrations/inch$^2$ | 550 | 550 | 550 |
| Needle Penetration Depth (inch) | 5/8 | 3/8 | 3/16 |
| Manufacturing Speed (ft./min.) (take-up roll advance) | 9.6 | 9.6 | 9.6 |

A second product was then made by the above procedure except that the above-described glass scrim was substituted for the Nomex scrim. The properties of the two products are set forth in the following table:

TABLE 1

|  | Product 1 | Product 2 |
|---|---|---|
| Nomex (top and bottom layers) | 3.5 oz./yd.$^2$ | 3.5 oz./yd.$^2$ |
| Nomex scrim | 3.5 oz./yd.$^2$ |  |

TABLE 1-continued

| | Product 1 | Product 2 |
|---|---|---|
| Glass media | 1.5 oz./yd.$^2$ | 1.5 oz./yd.$^2$ |
| Glass scrim | | 4.5 oz./yd.$^2$ |
| Thickness inches | 0.092–0.097 | 0.087–0.091 |
| Mullen burst psi | 345–375 | 210–255 |
| Air Flow, cfm/ft.$^2$, 0.5" H$_2$O $\Delta$ Pressure | 27–30 | 24–26 |
| Thermal stability, percent shrinkage 24 hrs. at 450°F. | | |
| Machine Direction | 1.0% | 0.0% |
| Cross Direction | 1.0% | 0.5% |
| Tensile strength 2" strip | | |
| Machine Direction | 134 lbs. | 102 lbs. |
| Cross Direction | 134 lbs. | 167 lbs. |
| Elongation at 100 lbs. percent | | |
| Machine Direction | 13% | 78% |
| Cross Direction | 18% | 33% |

The filtering efficiencies of the two products are set forth in the following table:

TABLE 2

| Dust Particle Size in Microns | Filter Efficiency in Percent | |
|---|---|---|
| | Product 1 | Product 2 |
| 0.5 | 95 | 84 |
| 1.0 | 99 | 99 |
| 2.0 | 99 | 100 |
| 3.0 | 100 | — |

Note: These samples were all tested with 3.6 inches of water $\Delta$ P.

It will be apparent that many modifications and variations can be effected without departing from the scope of the novel concepts of the present invention and the illustrative details disclosed are not to be construed as imposing undue limitations on the invention.

We claim:

1. A high temperature resistant filtration material comprising:
   a. Two outer layers of nonwoven fabric of fibers of an aromatic polyamide having repeating units of the formula

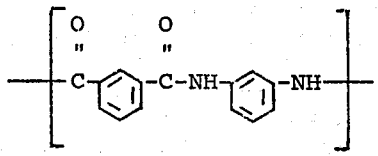

b. A first inner layer of nonwoven fabric of glass fibers, and
   c. A second inner layer of woven fabric made of yarns of glass or said aromatic polyamide,
   said layers being needled together into an integral structure.

2. A filtration material as claimed in claim 1 wherein said fibers of an aromatic polyamide of said outer layer have a maximum denier of 5.

3. A filtration material as claimed in claim 1 wherein the glass fibers of said first inner layer have a maximum denier of about 5.

4. A high temperature resistant filtration material comprising:
   a. Two outer layers of nonwoven fabric of fibers which have a maximum denier of about 5 and are composed of an aromatic polyamide having repeating units of the formula

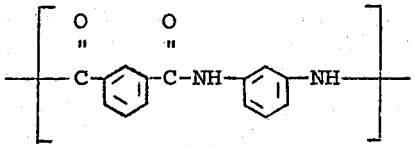

b. A first inner layer of nonwoven fabric of glass fibers having a maximum denier of about 5, said layer having a weight of about 1 to 10 ozs./yd.$^2$
   c. A second inner layer of woven fabric made of yarns of glass or said aromatic polyamide, said fabric having a weight of about 0.75 to 10 ozs./yd.$^2$
   said layers being needled together into an integral structure.

5. A filtration material as claimed in claim 4 wherein said woven fabric is made of yarn containing continuous glass filaments.

6. A filtration material as claimed in claim 4 wherein said woven fabric is made of spun yarn containing fibers of said aromatic polyamide.

* * * * *